US008849645B2

(12) United States Patent
Schultz et al.

(10) Patent No.: US 8,849,645 B2
(45) Date of Patent: Sep. 30, 2014

(54) ELECTRICAL POWER PROFILE SIMULATOR

(75) Inventors: Donald W. Schultz, Everett, WA (US); Alberto Ferrer, Bothell, WA (US); Joseph M. Keegan, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 304 days.

(21) Appl. No.: 13/290,028

(22) Filed: Nov. 4, 2011

(65) Prior Publication Data

US 2013/0117004 A1    May 9, 2013

(51) Int. Cl.
*G06G 7/54*    (2006.01)
*G06F 17/50*    (2006.01)

(52) U.S. Cl.
CPC ........ *G06F 17/5009* (2013.01); *G06F 17/5095* (2013.01); *G06F 2217/78* (2013.01)
USPC ............................... 703/18; 700/286; 703/21

(58) Field of Classification Search
USPC .......................................................... 703/18
See application file for complete search history.

(56) References Cited

U.S. PATENT DOCUMENTS

2012/0059532 A1\* 3/2012 Reifenhauser et al. ....... 700/297

OTHER PUBLICATIONS

Jérôme Faucher ("Simulation Study of new Aircraft Electrical Power Network performances", Aeroconseil Aircraft Engineering 2009, pp. 1-8).\*
Kurtoglu et al. ("Simulation-Based Design of Aircraft Electrical Power Systems", Palo Alto Research Center, 2010, pp. 1-9).\*
Christian Schallert et al.,"Generator Power Optimization for a More-Electric Aircraft by use of a Virtual Iron Bird", 25th Congress of the International Council of the Aeronautical Sciences, Hamburg Germany, Sep. 8, 2006.
Extended European Search Report from the European Patent Office for European Application No./Patent No. 12191343.8-1960.
S. Hanke, "A Simulation Framework for Aircraft Power Systems Architecting", ICAS 2008 26th International Congress of the Aeronautical Sciences, ICAS 2008, pp. 1-10.

\* cited by examiner

*Primary Examiner* — Omar Fernandez Rivas
*Assistant Examiner* — Iftekhar Khan
(74) *Attorney, Agent, or Firm* — Ameh IP; Lowell Campbell; Elahe Toosi

(57) ABSTRACT

A system and methods to simulate a power profile of an electrical system are disclosed. A combination of electrical devices operable to be electrically coupled to a common power source is virtually assembled, and empirically derived dynamic power requirements associated with each of the electrical devices are modeled. Power profiles for at least one electrical system configuration comprising the combination of electrical devices are generated using the empirically derived dynamic power requirements.

20 Claims, 8 Drawing Sheets

ELECTRICAL POWER PROFILE SIMULATOR

FIELD

Embodiments of the present disclosure relate generally to electrical power management. More particularly, embodiments of the present disclosure relate to simulation of electrical power profiles.

BACKGROUND

A perceived shortage of electrical power may result in overestimates of connected electrical loads and/or electrical cooling systems heat-loads. This perception of limited resources may result in reduced options and features made available to customers and can result in an overdesign of such electrical systems.

SUMMARY

A system and methods to simulate an electrical system's power profile are disclosed. A combination of electrical devices operable to be electrically coupled to a common power source is virtually assembled, and empirically derived dynamic power requirements associated with each of the electrical devices are modeled. Power profiles for various configurations comprising a combination of electrical devices using the empirically derived dynamic power requirements are generated.

Embodiments provide significantly more precise electrical power values for an assessment of electrical power and cooling requirements of a platform such as an aircraft. In this manner, a greater flexibility and choices are provided for customers using the electrical system. Further, the more precise electrical power values result in smaller, lighter and less expensive power generators, power distribution networks and cooling systems.

In an embodiment, a method to simulate a power profile of an electrical system virtually assembles a combination of electrical devices operable to be electrically coupled to a common power source, and models empirically derived dynamic power requirements associated with each of the electrical devices. The method further generates power profiles for at least one electrical system configuration comprising a combination of electrical devices using the empirically derived dynamic power requirements.

In another embodiment, an electrical system power profile simulator comprises a database, a device load connecter, an electrical power computational module, and an analyzer. The database comprises at least one empirical power load for a plurality of electrical devices coupled to an electrical system. The device load connecter is configured to selectively simulate at least one connection of the electrical system to the at least one dynamic power load for each of the electrical devices. The electrical power computational module is configured to generate a power load profile for each of the connected devices of the electrical system using the empirical dynamic power load. The analyzer is configured to determine an optimal configuration and time sequences for operation of each of the electrical devices respectively when connected to the electrical system.

In a further embodiment, a computer readable storage medium comprises computer-executable instructions for performing a method for electrical system power profile simulation. The method executed by the computer-executable instructions virtually assembles a combination of electrical devices operable to be electrically coupled to a common power source. The method executed by the computer-executable instructions further models empirically derived dynamic power requirements associated with each of the electrical devices. The method executed by the computer-executable instructions further generates power profiles for at least one electrical system configuration comprising the combination of electrical devices using the empirically derived dynamic power requirements.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
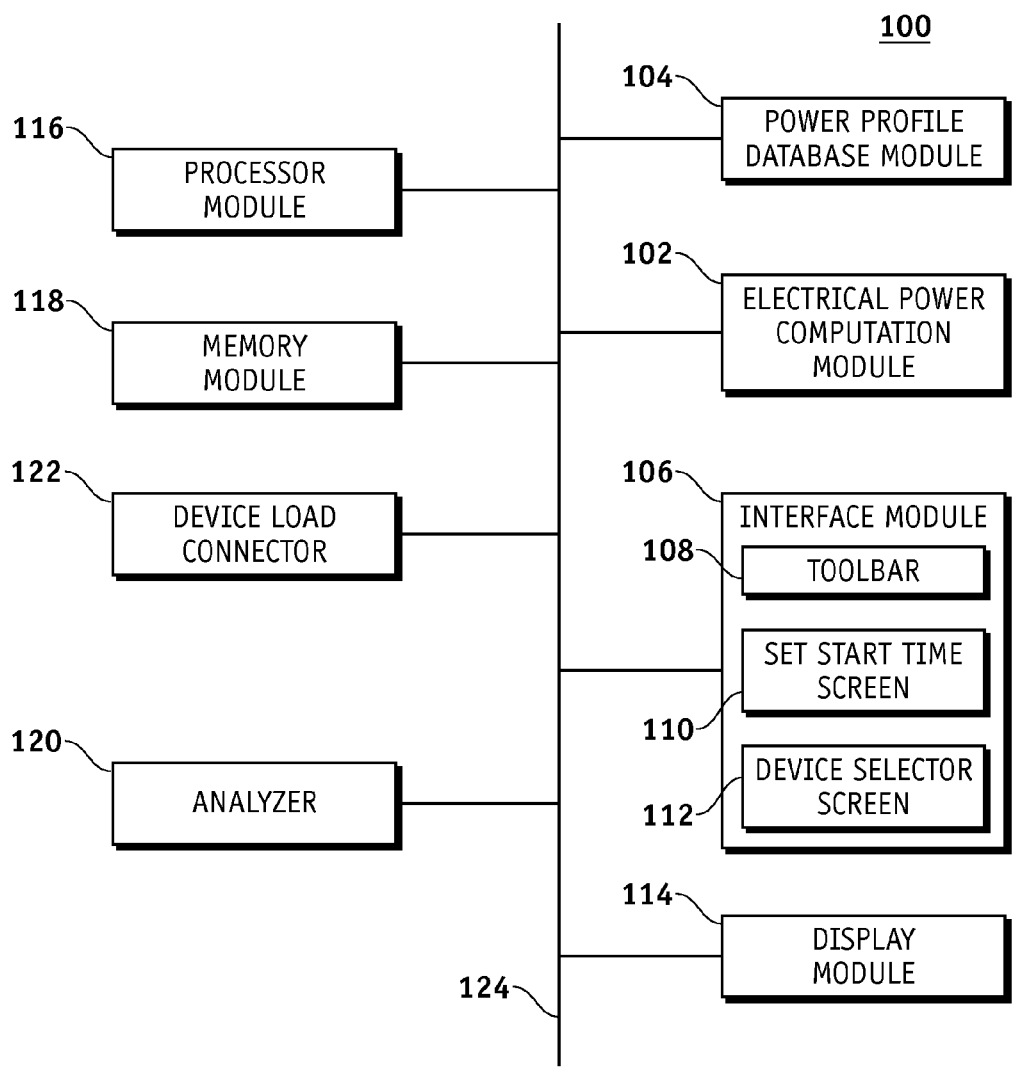
FIG. 1 is an illustration of an exemplary functional block diagram of an electrical power profile simulator according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to, power distribution systems, electrical systems, simulation software tools, and other functional aspects of the systems (and the individual operating components of the systems) may not be described in detail herein. In addition, those skilled in the art will appreciate that embodiments of the present disclosure may be practiced in conjunction with a variety of circuits, and that the embodiments described herein are merely example embodiments of the disclosure.

Embodiments of the disclosure are described herein in the context of a practical non-limiting application, namely, a simulation tool for assessing power requirement for operating an aircraft electrical system. Embodiments of the disclosure, however, are not limited to such aircraft electrical system applications, and the techniques described herein may also be utilized in other applications. For example but without limitation, embodiments may be applicable to automotive vehicles, ships, buildings, hospitals, factories, spacecraft, submarines, or any other type of special or general purpose host platform desirable or appropriate for a given application or environment.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide a system and method for providing an ability to generate a simulation model from empirical data that represents full dynamics of an operational environment. The embodiments provide significantly more precise electrical power values for an assessment of electrical power and cooling requirements for a platform such as an aircraft. In this manner, a greater flexibility and choices are provided for customers using the electrical system. Further, the more precise electrical power values result in smaller, lighter and less expensive generators, power distribution networks and cooling systems.

FIG. 1 is an illustration of an exemplary functional diagram of an electrical power profile simulator (simulator 100) according to an embodiment of the disclosure. The various illustrative blocks, modules, processing logic, and circuits described in connection with simulator 100 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. While the simulator 100 is applicable to a wide range of subsystems and modules of an electrical power profile simulator, an exemplary simulator 100 is schematically illustrated in FIG. 1.

The simulator 100 may comprise, for example but without limitation, a desktop, a laptop or notebook computer, a handheld computing device (PDA, cell phone, palmtop, etc.), a mainframe, a server, a client, or any other type of special or general purpose computing device as may be desirable or appropriate for a given application or environment. The simulator 100 generally comprises an electrical power computational module 102, a power profile database module 104, an interface module 106, a display module 114, processor module 116, a memory module 118, an analyzer 120, a device load connecter 122, and a network bus 124.

The simulator 100 comprises a custom application for simulating the combined power consumption of a collection of devices (electrical devices). The simulator 100 provides a software tool designed and built to better understand and characterize electrical systems power consumption during a routine operation such as a flight operation. The simulator 100 allows the user to model power usage of an electrical system (e.g., an aircraft galley system) for any combination of electrical system devices or electrical system configurations. The user can set and control parameters such as device start times, power levels, and mode of operation. The simulator 100 simulates and generates power curves using preexisting empirical power profiles. A variety of analytical and statistical functions are available from the simulator 100 that allow the user to calculate and display average power, cumulative average power and peak power consumption.

The electrical power computational module 102 is configured to generate a power load profile for each of connected devices of the electrical system respectively using at least one empirical dynamic power load. A simulation of power profiles provides the systems user with the necessary information to more precisely provision the electrical power and cooling systems requirements of a platform. The platform may comprise, for example but without limitation, a vehicle such as: an aircraft, a train, a submarine, or other vehicle, a factory, a building, a hospital, or other platform comprising electrical systems. Each platform may comprise various electrical systems each comprising various electrical devices connected to a common power source in a manner to perform a required function. For example, in a case of an aircraft, a galley electrical system comprises various electrical devices connected to a common power source to provide food and beverages to the passengers.

A combination of technical data comprising measured power profiles for individual devices and the simulation of power profiles at the system level by simulator 100 provides the systems user with the necessary information to more precisely provision the power and cooling systems of the various electrical devices. In addition to producing a more precise set of electrical and cooling requirements, the simulator 100 will also permit the user the ability to determine multiple configurations for systems such as an aircraft galley system and power networks. For example, the user may select galley components (e.g., coffee pots, ovens, etc.) and electrical loads thereof by selecting a galley library folder using the device selector interface screen 112 as described below.

The analyzer 120 is configured to determine an optimal configuration and time sequence during operation of each of the electrical devices respectively when connected to the electrical system. The optimal configuration and time sequence may comprise, for example but without limitation, an operation time sequence for each of the electrical devices, an operation mode for each of the electrical devices, a power usage of each of the electrical devices, or other device operation or configuration characteristic. For example, the optimal configuration and time sequence may specify a power-on time sequence and/or power usage sequence of connected electrical devices.

The optimal configuration and time sequence can be used to regulate a plurality of devices during operation thereof. In this manner, the optimal configuration can ensure the electrical devices don't exceed a defined electrical system capability (e.g., power available for the electrical system and each of the devices thereof). For example, the optimal configuration and time sequences may be based on a priority of the electrical devices as explained in more detail below in the context of discussion of FIG. 8.

Based on the optimal configuration and time sequence, the analyzer 120 can generate a power profile from empirically derived dynamic power requirements associated with each device for at least one device or a combination of devices. In this manner, the time sequence for operation of each of the electrical devices can be determined based on or as a function of a usage and/or system requirement of the electrical system as defined by the user and/or system requirements (e.g., electrical system requirements). Furthermore, determining the optimal configuration and time sequences for operation of each of the electrical devices allows expanding available power of the electrical system to more electrical devices.

The device load connecter 122 is configured to selectively simulate connections of the dynamic power loads for each of the devices to the electrical system.

The power profile database module 104 is operable to store, for example but without limitation, the empirically derived dynamic power requirements associated with each device. The imperial power profiles may comprise, for example but without limitation, a combination of technical data comprising measured power profiles for individual electrical devices, or other measured electrical power data. The imperial power profiles represents empirically derived dynamic power curves of any combination of electrical devices, under any defined or random operational conditions (e.g., timing & frequency) of the electrical system that might be encountered on a platform such as a passenger aircraft. Additionally, the power profile database module 104 is operable to store, for example but without limitation, electrical system requirements, electrical system configuration data, algorithms, methodologies, or other data and application, that may be used in the simulator 100.

Figure 2:
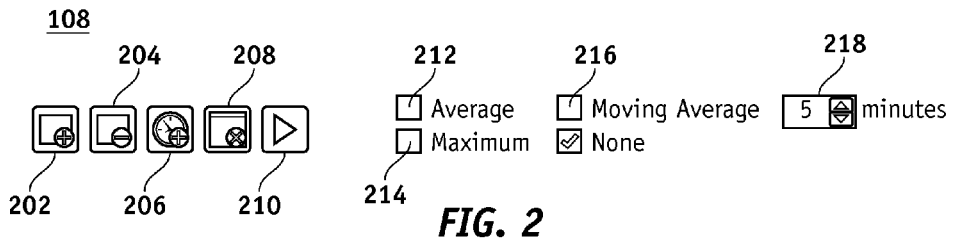
FIG. 2 is an illustration of an exemplary toolbar interface screen of an electrical power profile simulator according to an embodiment of the disclosure.
Figure 3:
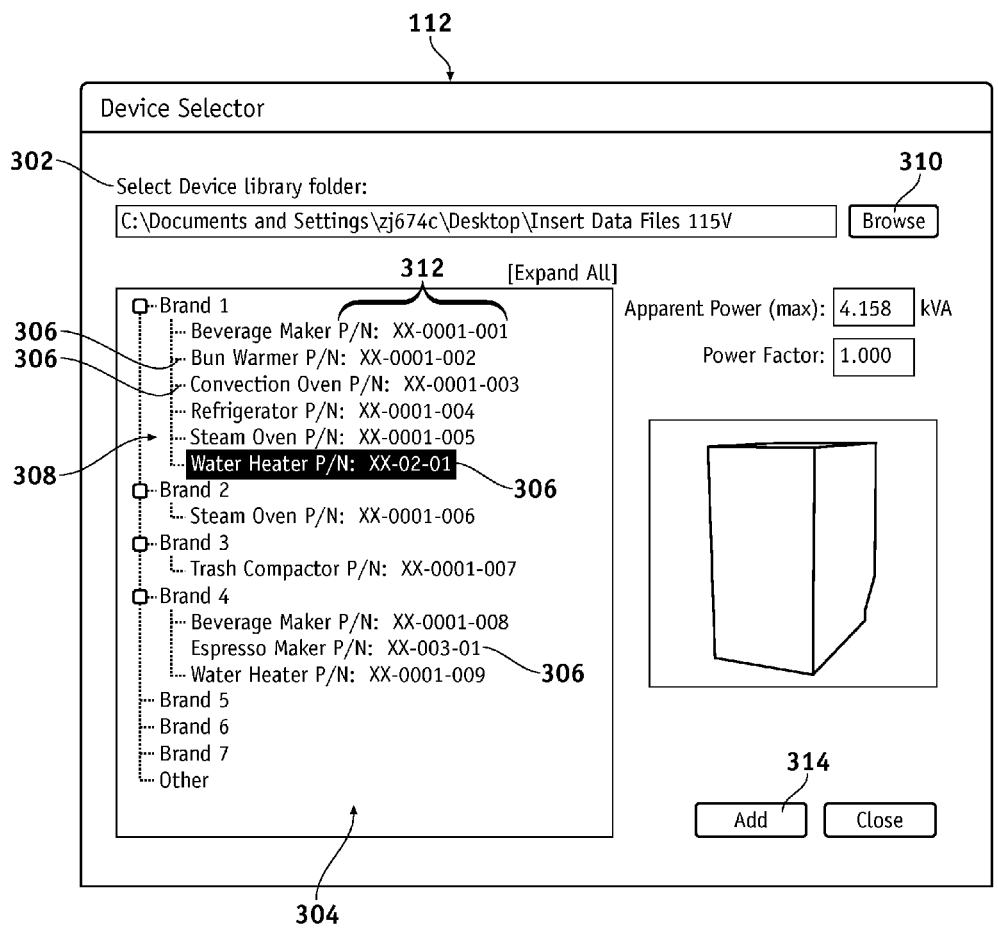
FIG. 3 is an illustration of an exemplary device selector interface screen of an electrical power profile simulator according to an embodiment of the disclosure.
Figure 4:
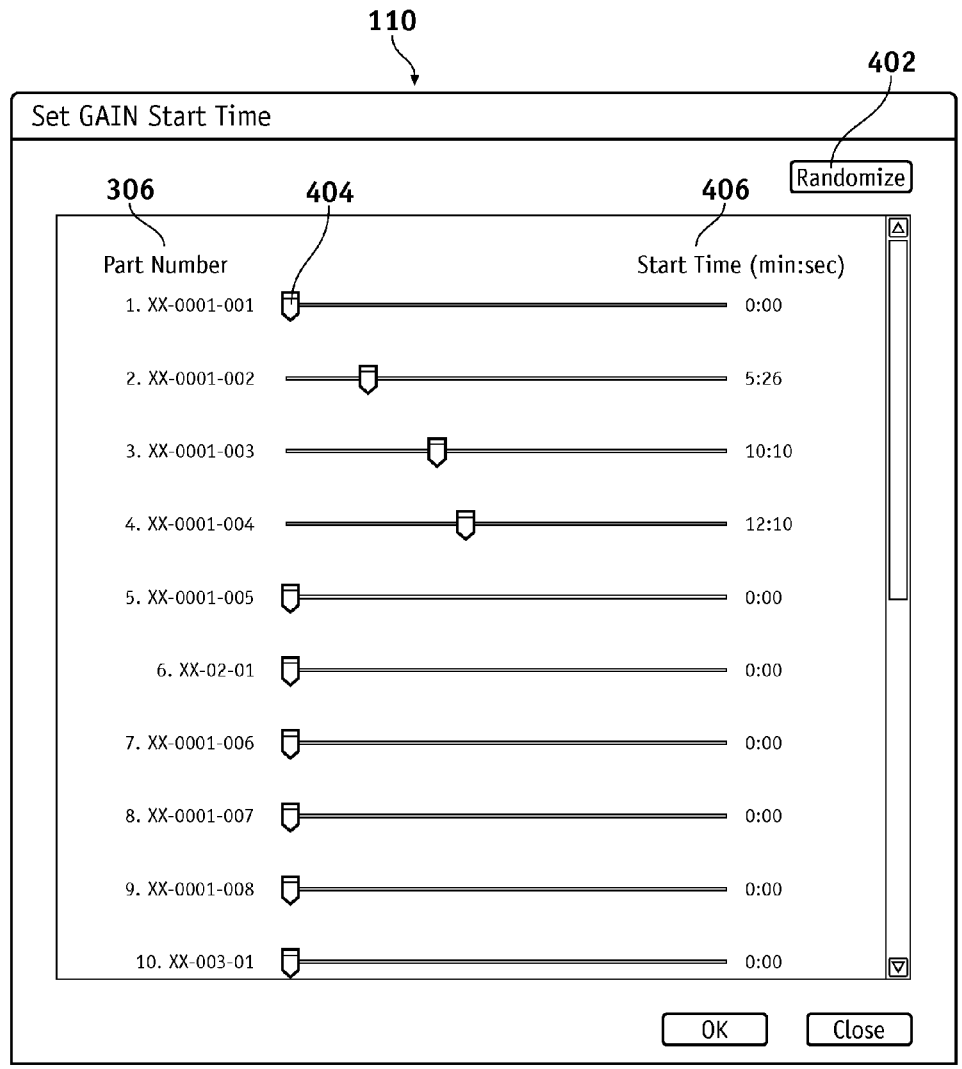
FIG. 4 is an illustration of an exemplary electrical power profile simulator device start times interface screen according to an embodiment of the disclosure.

The interface module 106 may comprises, for example but without limitation, a toolbar interface screen 108, a set start times interface screen 110, a device selector interface screen 112, or other interface screen, as explained in more detail in the context of discussion of FIGS. 2-4.

The display module 114 is operable to present tabular and graphical information thereon. For example, the display module 114, may display, a simulated electrical power profile graph 500 (FIG. 5), a device stack graph 600 (FIG. 6), a histogram of an electrical power profile 700 (histogram 700) FIG. 7), the toolbar interface screen 108, the set start times interface screen 110, the device selector interface screen 112, or other information. The display module 114 may be formed by any display technology known in the art.

The processor module 116 comprises processing logic that is configured to carry out the functions, techniques, and processing tasks associated with the operation of the simulator 100. In particular, the processing logic is configured to support the electrical system management of the simulator 100 described herein. For example, the processor module 116 controls the interface module 106 to present an interface to present tabular and graphical information thereon.

The processor module 116 also accesses electrical system configuration data and electrical system requirements stored in the power profile database module 104 to support functions of the simulator 100. Further, the processor module 116 controls operations of the electrical power computational module 102, the power profile database module 104, the interface module 106, the display module 114, whereby the simulator 100 allows the user to model power usage of an electrical system (e.g., galley) for any combination of electrical system devices or electrical system configurations.

In this manner, the processor module 116 enables users and operators of the simulator 100 to easily and efficiently analyze an electrical loading on a power distribution system to optimize operation and prevent unexpected overloading of the electrical system.

The processor module 116 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 118 may be a data storage area with memory formatted to support the operation of the simulator 100. The memory module 118 is configured to store, maintain, and provide data as needed to support the functionality of the simulator 100 in the manner described below. In practical embodiments, the memory module 118 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 118 may be coupled to the processor module 116 and configured to store, for example but without limitation, the power profile database module 104, a computer program that is executed by the processor module 116, an operating system, an application program, tentative data used in executing a program, or other application. Additionally, the memory module 118 may represent a dynamically updating database containing a table for updating the power profile database module 104.

The memory module 118 may be coupled to the processor module 116 such that the processor module 116 can read information from and write information to the memory module 118. As an example, the processor module 116 and memory module 118 may reside in respective application specific integrated circuits (ASICs). The memory module 118 may also be integrated into the processor module 116. In an embodiment, the memory module 118 may comprise a cache memory for storing temporary variables or other intermediate information during execution of instructions to be executed by the processor module 116.

FIG. 2 is an illustration of an exemplary toolbar interface screen 108 of an electrical power profile simulator according to an embodiment of the disclosure. The toolbar interface screen 108 may be located on the display module 114. The toolbar interface screen 108 may comprise, for example but without limitation, an Add Device Button 202, a Delete Device Button 204, a Set Start Times Button 206 a Delete Simulation Button 208, a Run Simulation Button 210, an Average Power Checkbox 212, a Maximum Power Checkbox 214, a Moving-average Power Checkbox 216, a Moving-average time window selector 218, or other toolbar interface.

Figure 5:
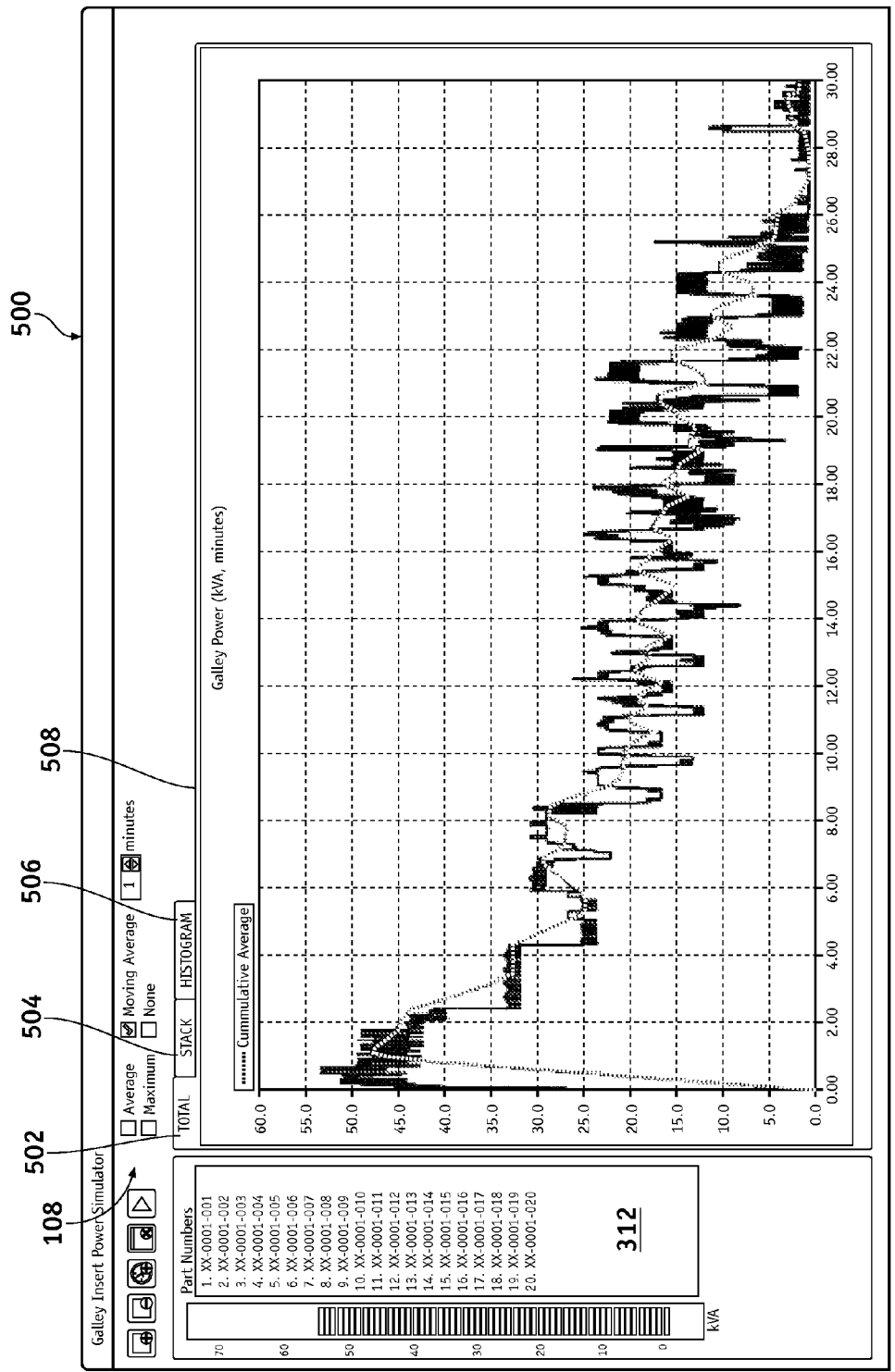
FIG. 5 is an illustration of an exemplary simulated electrical power profile graph according to an embodiment of the disclosure.
Figure 6:
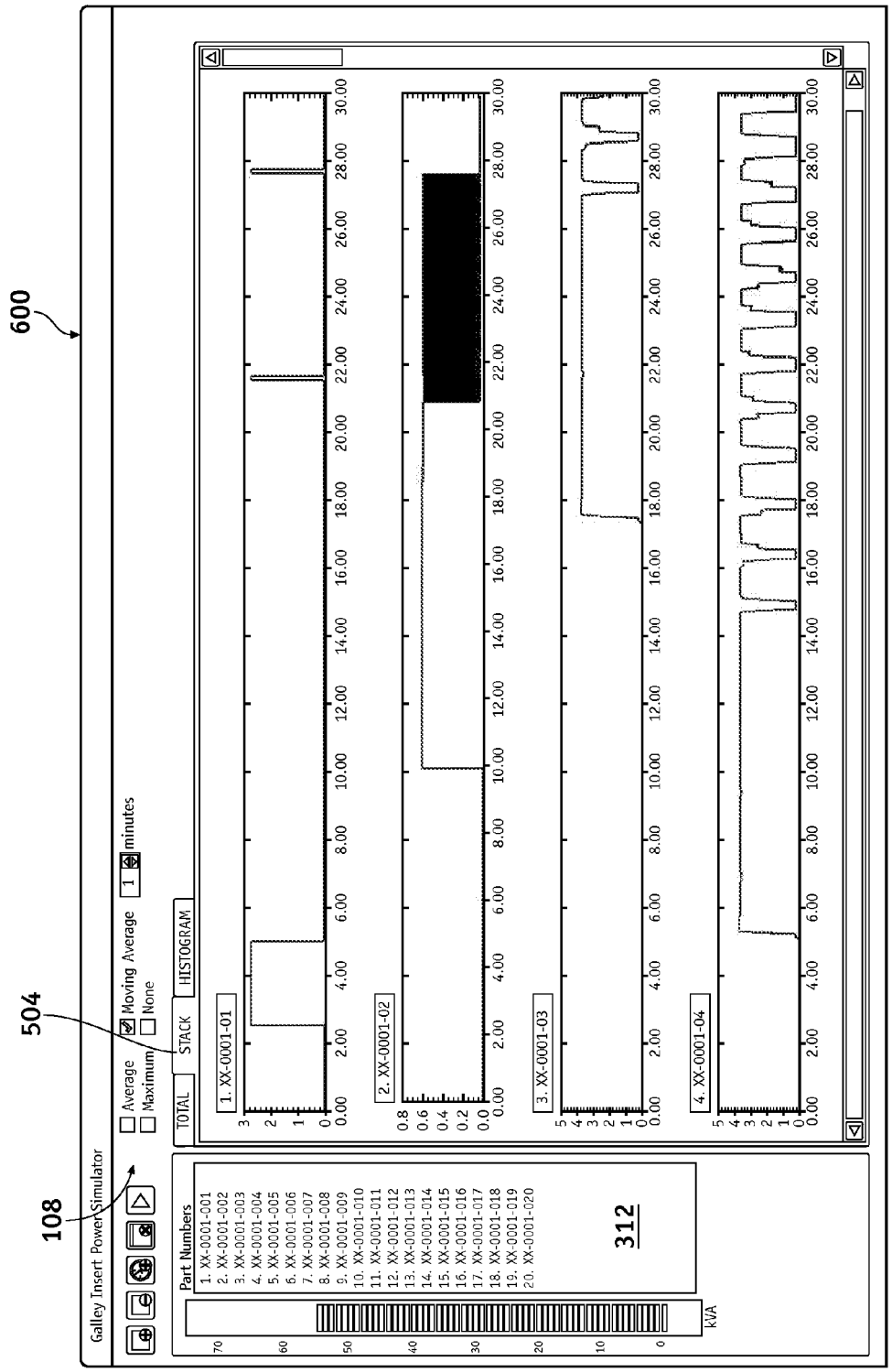
FIG. 6 is an illustration of an exemplary device stack graph according to an embodiment of the disclosure.
Figure 7:
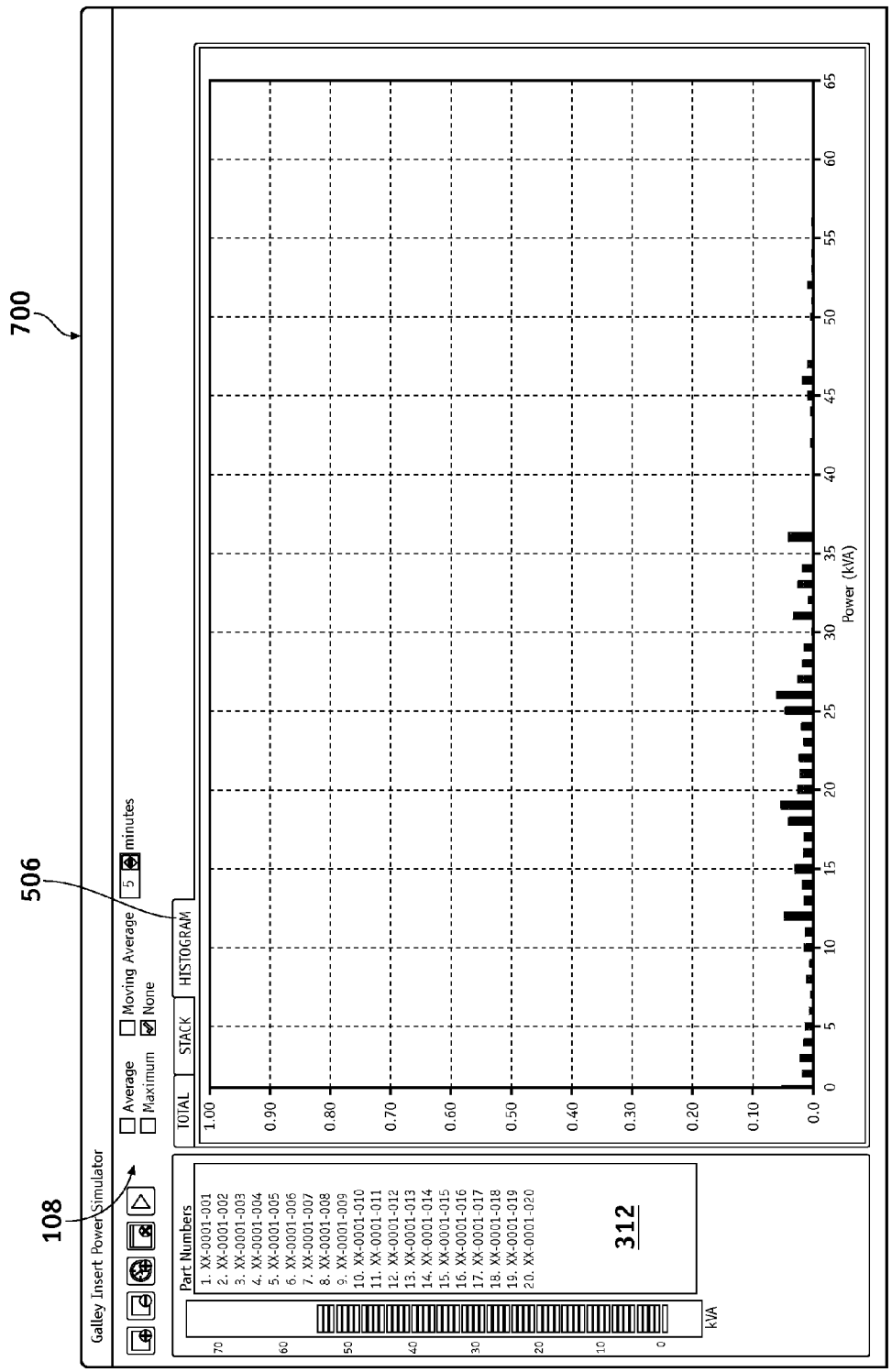
FIG. 7 is an illustration of an exemplary histogram of a simulated electrical power profile according to an embodiment of the disclosure.

The Add Device Button 202 is configured to activate the device selector interface screen 112 (FIG. 3). The Delete Device Button 204 is configured to delete electrical system devices 306 (devices 306) added to a part number bin 308 (FIG. 3) and from the electrical power simulation. The Set Start Times Button 206 is configured to activate the set start times interface screen 110 (FIG. 4), allowing the user to set the start times for operating each electrical device. The Delete Simulation Button 208 in configured to deactivate/clear a current list of devices selected and to clear the graphs 500-700 (FIG. 5-7). The Run Simulation Button 210 is operable to activate the electrical power simulation of the simulator 100. The Average Power Checkbox 212, the Maximum Power Checkbox 214, the Moving-average Power Checkbox 216, when activated, are configured to display, a total average power graph, a maximum power graph, and a moving-average power graph respectively. The Moving-average time window selector 218 is configured to set a time window for the moving-average power graph.

FIG. 3 is an illustration of an exemplary device selector interface screen 112 of an electrical power profile simulator according to an embodiment of the disclosure. When the simulator 100 is first started a blank graph (not shown) is displayed and the device selector interface screen 112 is presented on the display module 114. The user can select a device library folder 302, a folder comprising the device profiles.

In this manner, a combination of electrical devices operable to be electrically coupled to a common power source can be virtually assembled. The combination can be either a possible combination or a preselected combination. The configurations of the combination of electrical devices may be based on, for example but without limitation, a predefined condition, a random operational condition, or other suitable operational condition. The device load connecter 122 simulates connections of the dynamic power loads for each of the devices to the electrical system selected via the device selector interface screen 112.

Once the device library folder 302 is selected, the device selector interface screen 112 is populated with a list of devices 304 to choose from. A simulation comprises one or more of the devices 306 added to a part number bin 308 by using the device selector interface screen 112. The devices 306 may comprise, for example but without limitation, a beverage maker, a bun warmer, a convention oven, a refrigerator, a steam oven, a fan, an air conditioner, a light, a television, an electric motor, an electric actuator, an electric landing gear actuation system, an electrical braking system, or other electrical device.

To add new devices, the user can click or activate a Browse Button 310, select the device library folder 302 comprising the desired device profile library, select a device part number 312 from the part number bin 308, and click or activate the ADD Button 314.

FIG. 4 is an illustration of an exemplary electrical power profile simulator set start times interface screen 110 according to an embodiment of the disclosure. The simulator allows the user to define a unique start time of each of the devices 306 in the list of devices 304. A user can click or activate the Set Start Times Button 206 (FIG. 2) to bring up the set start times screen. Each device part number 312 selected is displayed with a track bar 404 next to it. The user can slide the track bar 404 to set a desired start time 406. For the embodiment shown in FIG. 4, all start times default to 0:00. The user can click or activate the Randomize Button 402 to have the simulator 100 set random start times to each device part number 312. The start times will be generated using a random number generator of the simulator 100. Simulated electrical power profiles generated by the simulator 100 can then be viewed as explained below.

FIG. 5 is an illustration of an exemplary simulated electrical power profile graph 500 showing total power according to an embodiment of the disclosure. FIG. 6 is an illustration of an exemplary device stack graph 600 according to an embodiment of the disclosure. FIG. 7 is an illustration of an exemplary histogram 700 of a simulated electrical power profile according to an embodiment of the disclosure.

In this example, a graph area 508 provides three buttons for selecting a view of the simulation electrical power profiles. A TOTAL tab 502 is configured to display an aggregate power for the list of devices 304 selected as shown in FIG. 5. The STACK tab 504 is configured to show a graph of each of the electrical system devices 306 power individually as shown in FIG. 6, and a HISTOGRAM tab 506, is an analytic graph showing a distribution of power levels for the current simulation as shown in FIG. 7.

Figure 8:
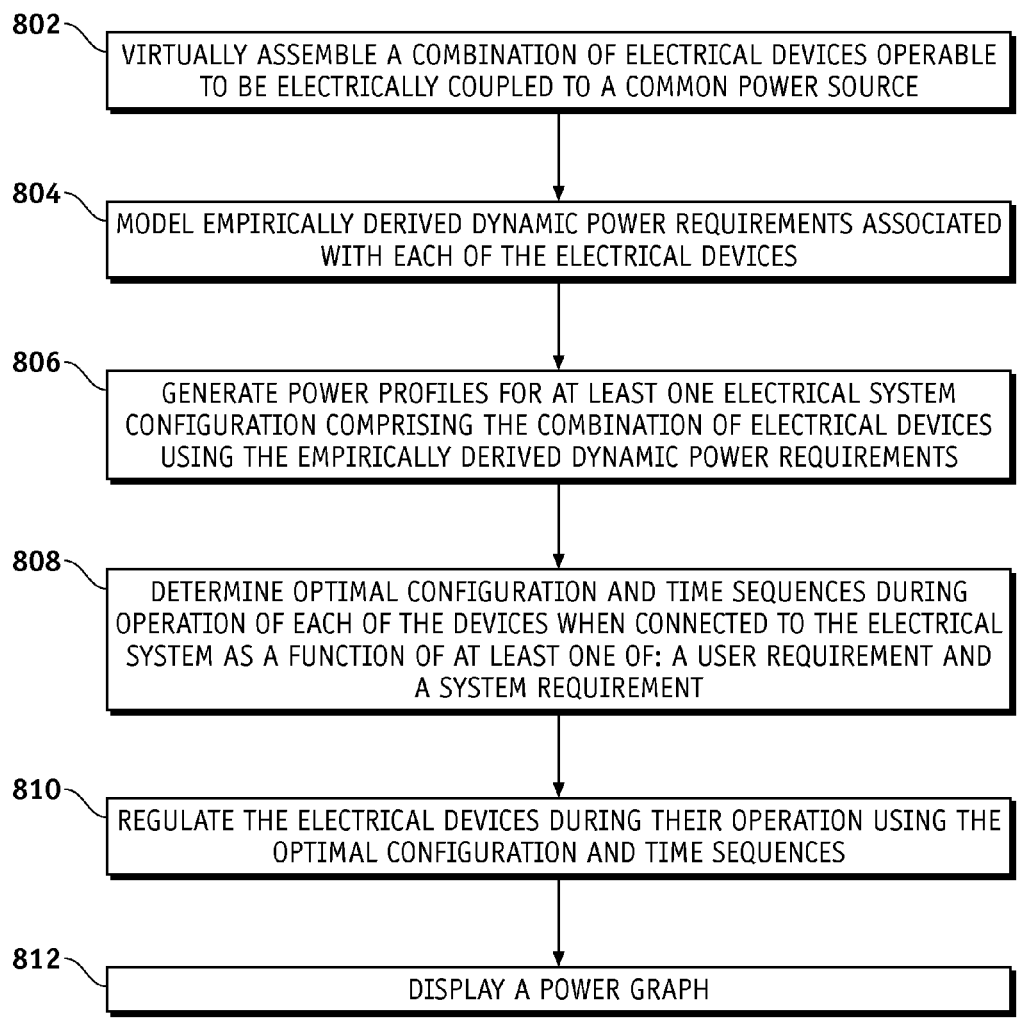
FIG. 8 is an illustration of an exemplary flowchart showing an electrical power profile simulation process according to an embodiment of the disclosure.

FIG. 8 is an illustration of an exemplary flowchart showing an electrical power profile simulation process 800 that can be performed by the simulator 100 according to an embodiment of the disclosure. The various tasks performed in connection with process 800 may be performed mechanically, by software, hardware, firmware, a computer-readable medium having computer executable instructions for performing the process method, or any combination thereof. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein.

For illustrative purposes, the following description of process 800 may refer to elements mentioned above in connection with FIGS. 1-7. In practical embodiments, portions of the process 800 may be performed by different elements of the simulator 100 such as: an electrical power computational module 102, a power profile database module 104, an interface module 106, a display module 114, processor module 116, a memory module 118, etc. Process 800 may have functions, material, and structures that are similar to the embodiments shown in FIGS. 1-7. Therefore common features, functions, and elements may not be redundantly described here.

Process 800 may begin by virtually assembling a combination of electrical devices operable to be electrically coupled to a common power source (task 802).

Process 800 may continue by modeling empirically derived dynamic power requirements associated with each of the electrical devices (task 804).

Process 800 may continue by generating power profiles for at least one electrical system configuration comprising the combination of electrical devices using the empirically derived dynamic power requirements (task 806). The configuration of the combination of electrical devices may be based upon predefined or random operational conditions. The combination is one of possible and preselected.

Process 800 may continue by determining optimal configuration and time sequences during operation of each of the electrical devices when connected to the electrical system as a function of at least one of: a user requirement and a system requirement (task 808).

Process 800 may continue by regulating the electrical devices during their operation using the optimal configuration and time sequences (task 810). Regulating the electrical devices may further comprise regulating the electrical devices such that the electrical devices do not exceed the defined electrical system capability of the electrical system. The optimal configuration and time sequences may be based on a priority of the electrical devices such as a high priority electrical device and a low priority electrical device. Thus, power can be regulated and prioritized as a function of defined user requirements and/or system requirements such as electrical system requirements. For example, a component significant to operation of a vehicle (e.g., an electric actuator) may take priority for power over a component with a lesser significance to operation of the vehicle (e.g., a fan) requiring power. A priority of a given component may change during a course of operation of the vehicle (e.g., different phases of flight). Thus, the optimal configuration and time sequences may also be based on a priority of using components during different phases of operation.

Process 800 may continue by displaying a power graph (task 812). The power graph may comprise for example but without limitation, a total average power graph, a maximum power graph, and/or a moving-average power graph.

Figure 9:
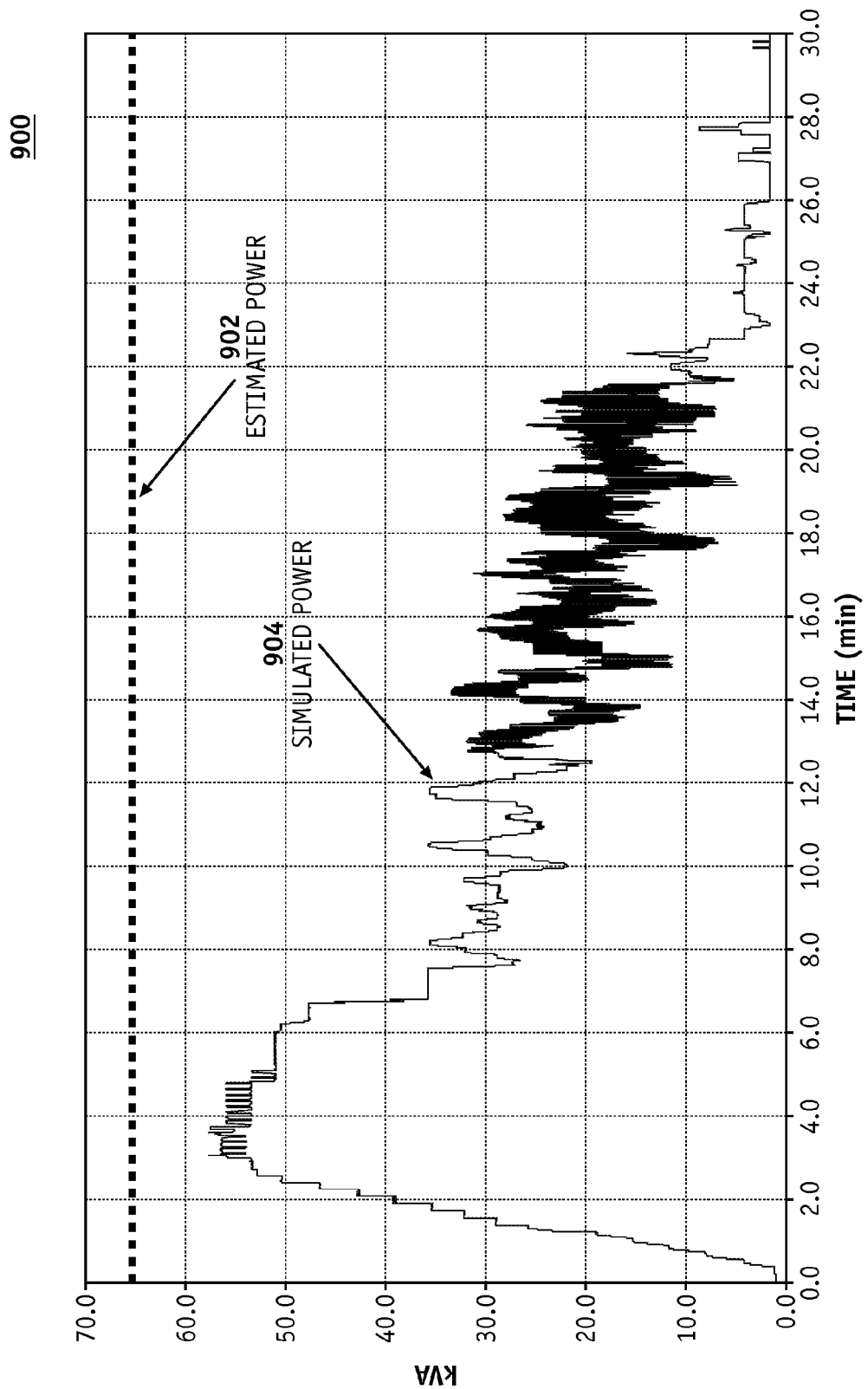
FIG. 9 is an illustration of an exemplary graph showing a comparison between a conservative estimated power profile generated by an existing method and a simulated power profile generated by a simulator according to an embodiment of the disclosure.

In this manner, the embodiments provide significantly more precise electrical power values for an assessment of platform electrical power and cooling requirements than the existing methods as shown in FIG. 9.

FIG. 9 is an illustration of an exemplary graph 900 showing a comparison between a conservative estimated power profile 902 generated by an existing method and a simulated power profile 904 generated by the simulator 100 according to an embodiment of the disclosure. As shown in FIG. 9, the simulated power profile 904 generated by the simulator 100 described herein provides more precise electrical power values for an assessment of platform electrical power and cooling requirements as compared to the conservative estimated power profile 902. In this manner, a greater flexibility and choices are provided for customers using the electrical system. Thereby, the user can choose lighter and less expensive power generators, power distribution networks and cooling systems.

In this way, embodiments of the disclosure provide a simulation tool to provide necessary information to more precisely provision the power and cooling systems of an electrical system. In addition to producing a more precise set of electrical and cooling requirements, the simulation tool will also permit the user the ability to determine multiple configurations for the electrical system.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 116 to cause the processor module 116 to perform specified operations. Such instructions, generally referred to as "computer program code" or "program code" (which may be grouped in the form of computer programs or other groupings), when executed, enable electrical load analysis of the simulator 100.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-3 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A method to simulate a power profile of an electrical system, the method comprising:
    virtually assembling a combination of electrical devices operable to be electrically coupled to a common power source;
    modeling empirically derived dynamic power requirements associated with each of the electrical devices based on measured power profiles;
    generating power profiles for at least one electrical system configuration comprising the combination of electrical devices using the empirically derived dynamic power requirements, wherein the at least one electrical system configuration is based on a random operational condition comprising a start time of each of the electrical devices; and
    determining optimal configuration and time sequences of each of the electrical devices.

2. The method of claim 1, further comprising displaying at least one of:
    a total average power graph, a maximum power graph, and a moving-average power graph.

3. The method of claim 1, wherein the combination is one of possible and preselected.

4. The method of claim 1, wherein the power profile is simulated to determine power requirements for a vehicle.

5. The method of claim 1, wherein the optimal configuration and time sequences comprise at least one of: an operation time sequence for each of the electrical devices, an operation mode for each of the electrical devices, and a power usage of each of the electrical devices.

6. The method of claim 5, further comprising regulating the electrical devices during their operation using the optimal configuration and time sequences.

7. The method of claim 6, wherein the step of regulating further comprises regulating the electrical devices such that the electrical devices do not exceed a defined electrical system capability of the electrical system.

8. An electrical system power profile simulator, comprising:
 a database comprising at least one empirical dynamic power load for a plurality of electrical devices coupled to an electrical system;
 a device load connecter configured to selectively simulate at least one connection of the electrical system to the at least one dynamic power load for each of the electrical devices to provide connected devices;
 an electrical power computational module configured to generate a power load profile for at least one electrical system configuration comprising a combination of the connected devices of the electrical system respectively using the at least one empirical dynamic power load based on measured power profiles, wherein the at least one electrical system configuration is based on a random operational condition comprising a start time of each of the electrical devices; and
 an analyzer configured to determine an optimal configuration and start time sequence for operation of each of the electrical devices respectively when connected to the electrical system.

9. The electrical power profile simulator of claim 8, wherein the power load profile incorporates a plurality of operational conditions of the electrical system.

10. The electrical power profile simulator of claim 8, wherein the optimal configuration and the start time sequence are used to regulate the electrical devices during operation of the electrical devices.

11. The electrical power profile simulator of claim 10, wherein the optimal configuration and the start time sequence are used to regulate the electrical devices during operation of the electrical devices such that the electrical devices do not exceed a defined electrical system capability of the electrical system.

12. The electrical power profile simulator of claim 8, further comprising an interface module comprising: a toolbar interface screen, a device select interface screen, and a set start times interface screen.

13. The electrical power profile simulator of claim 8, further comprising a display module operable to display at least one of: a toolbar interface screen, a device select interface screen, a set start times interface screen, a total average power graph, a maximum power graph, and a moving-average power graph.

14. A non-transitory computer readable storage medium comprising computer-executable instructions for performing a method for electrical power profile simulation, the method executed by the computer-executable instructions comprising:
 virtually assembling a combination of electrical devices operable to be electrically coupled to a common power source;
 modeling empirically derived dynamic power requirements associated with each of the electrical devices based on measured power profiles;
 generating power profiles for at least one electrical system configuration comprising the combination of electrical devices using the empirically derived dynamic power requirements, wherein the at least one electrical system configuration is based on a random operational condition comprising a start time of each of the electrical devices; and
 determining optimal configuration and time sequences of each of the electrical devices.

15. The non-transitory computer readable storage medium of claim 14, the method executed by the computer-executable instructions further comprising establishing the optimal configuration and time sequences during the operation of each of the electrical devices when connected to the electrical system as a function of at least one of: a user requirement and a system requirement.

16. The non-transitory computer readable storage medium of claim 15, the method executed by the computer-executable instructions further comprising regulating the electrical devices during their operation using the optimal configuration and time sequences such that the electrical devices do not exceed a defined electrical system capability of the electrical system.

17. The non-transitory computer readable storage medium of claim 14, wherein the power profile for the at least one electrical system configuration is simulated to determine power requirements for a vehicle.

18. The non-transitory computer readable storage medium of claim 14, the method executed by the computer-executable instructions further comprising providing an interface module comprising: a toolbar interface screen, a device select interface screen, and a set start times interface screen.

19. The non-transitory computer readable storage medium of claim 14, the method executed by the computer-executable instructions further comprising displaying at least one of: a toolbar interface screen, a device select interface screen, a set start times interface screen, a total average power graph, a maximum power graph, and a moving-average power graph.

20. The non-transitory computer readable storage medium of claim 14, wherein the optimal configuration and the time sequences comprise at least one of: an operation time sequence for each of the electrical devices, an operation mode for each of the electrical devices, and a power usage of each of the electrical devices.

* * * * *